United States Patent [19]

Mullins et al.

[11] Patent Number: 5,077,350

[45] Date of Patent: Dec. 31, 1991

[54] PREPARATION OF POLY (ARYL ETHER/THIOETHER)-POLY(ARYL CARBONATE BLOCK COPOLYMERS

[75] Inventors: Michael J. Mullins; Edmund P. Woo, both of Midland, Mich.

[73] Assignee: The Dow Chemical Company, Midland, Mich.

[21] Appl. No.: 511,915

[22] Filed: Apr. 16, 1990

Related U.S. Application Data

[63] Continuation of Ser. No. 216,597, Jul. 8, 1988, abandoned.

[51] Int. Cl.$^5$ .............................. C08G 65/48
[52] U.S. Cl. .................. 525/394; 525/462; 525/534; 525/535; 525/537
[58] Field of Search ........................ 525/394, 462

[56] References Cited

U.S. PATENT DOCUMENTS

| | | | |
|---|---|---|---|
| 3,875,256 | 4/1975 | White | 525/394 |
| 4,210,731 | 7/1980 | Relles et al. | 525/394 |
| 4,634,743 | 1/1987 | Prier | 525/394 |
| 4,777,221 | 10/1988 | Campbell et al. | 525/394 |
| 4,845,806 | 2/1987 | Freitag et al. | 525/394 |
| 4,857,977 | 4/1987 | Peters | 525/394 |
| 4,880,884 | 11/1989 | Mullins et al. | 525/462 |
| 4,973,628 | 11/1990 | Campbell et al. | 525/394 |
| 4,994,533 | 2/1991 | Mullins et al. | 525/462 |
| 5,010,143 | 4/1991 | Evans et al. | 525/394 |

FOREIGN PATENT DOCUMENTS 182318  11/1982  Japan ............................... 525/394

OTHER PUBLICATIONS

Webster et al., Polyaryl Ether-Polyarylate Block Copolymers, Polymer Science, vol. 4, 1984, pp. 959-975.

*Primary Examiner*—John C. Bleutge
*Assistant Examiner*—David W. Woodward

[57] ABSTRACT

Poly(aryl ether/thioether)-poly(aryl carbonate) block copolymers are prepared by reacting a poly(aryl carbonate) with a poly(aryl ether/thioether) having at least one electron-withdrawing group located in a position ortho or para to its ether/thioether linking group, in the presence of an exchange catalyst. At least a portion of the poly(aryl ether/thioether) blocks are joined to the poly(aryl carbonate) blocks through an ether/thioether oxygen or sulfur atom.

43 Claims, No Drawings

PREPARATION OF POLY (ARYL ETHER/THIOETHER)-POLY(ARYL CARBONATE BLOCK COPOLYMERS

CROSS-REFERENCE TO RELATED APPLICATION

This is a continuation of application Ser. No. 216,597, filed July 8, 1988 now abandoned.

BACKGROUND OF THE INVENTION

This invention relates to polyetherpolycarbonate copolymers. More particularly, the invention relates to poly(aryl ether/thioether)-poly(aryl carbonate) block copolymers and to the preparation of such block copolymers.

Polycarbonates are well-known commercially available resinous materials having a variety of applications. They are typically prepared by the reaction of dihydroxy compounds and a carbonate precursor, such as phosgene. The polycarbonates are high temperature, high performance thermoplastic engineering polymers with a good combination of thermal and mechanical properties, especially when the polymer is prepared from one or more aromatic diols. However, the polycarbonates do exhibit relatively poor hydrolytic stability and poor solvent resistance, particularly when exposed to humid environments for prolonged times and/or at elevated temperatures.

Attempts to modify the properties of polycarbonates resins by blending with other polymeric materials are quite often unsatisfactory because of the incompatibility of the polycarbonates with other resinous materials. To overcome this problem, it has been proposed to polymerize other resinous materials into the polycarbonate molecule. Thus, random, block and graft copolymers of polycarbonates and other polymers, such as polyethers, are known. For example, polyether sulfone has been interpolymerized into the polycarbonate molecule by preparing a hydroxyl-terminated polyether sulfone and condensing it with 2,2-bis-(4-hydroxyphenyl)-propane (Bisphenol A) using phosgene in the presence of a catalyst, and also by the pyridine-catalyzed reaction of chloroformate-terminated polycarbonate with hydroxyl-terminated polyether sulfone in a common solvent.

Poly(aryl ether/thioether)-poly(aryl carbonate) copolymers may also be prepared by combining a hydroxyl-terminated polyether/thioether sulfone and a Bisphenol A polycarbonate, and extending the copolymer to a high molecular weight by phosgenation in a common solvent:

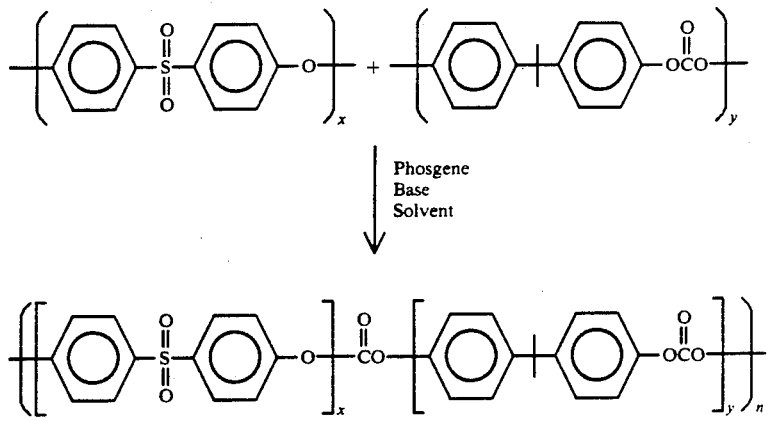

See McGrath, et al., Amer. Chem. Soc., Polymer Reprints, 19(1), p. 109 (1978).

In each of these methods, a carbonate radical links the polycarbonate and polyether/thioether blocks.

SUMMARY OF THE INVENTION

The present invention is directed toward a novel class of poly(aryl ether/thioether)-poly(aryl carbonate) block copolymers, wherein at least a portion of the poly(aryl ether/thioether) blocks are joined to the poly(aryl carbonate) blocks through an ether/thioether oxygen or sulfur atom. The poly(aryl ether/thioether)-poly(aryl carbonate) block copolymers of the present invention are surprisingly prepared by either:

1. contacting at least one activated poly(aryl ether/thioether) polymer corresponding to the formula:

wherein A is an activated aromatic radical having at least one electron-withdrawing group located in a position ortho or para to its ether/thioether linking group, O' is oxygen or sulfur in the case of the thioether, and n represents the number of repeated activated aryl ether/thioether units in the activated poly(aryl ether/thioether) polymer, with at least one poly(aryl carbonate) polymer corresponding to the formula:

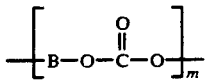

wherein B is a nonactivated aromatic radical which is characterized by the absence of an electron-withdrawing group located in a position ortho or para to its carbonate linking group, O is oxygen, C is carbon, and m represents the number of repeated aryl carbonate units in the poly(aryl carbonate) polymer, in the presence of an effective amount of at least one exchange catalyst, at an elevated temperature and for a time, sufficient to prepare a poly(aryl ether/thioether)-poly(aryl carbonate) block copolymer corresponding to the formula:

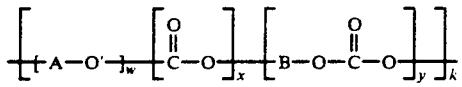

wherein A, B, O, O' and C are as previously defined, w represents the number of repeated activated aryl ether/thioether units in the poly(aryl ether/thioether)-poly(aryl carbonate) block copolymer, y represents the number of repeated aryl carbonate units in the poly(aryl ether/thioether)-poly(aryl carbonate) block copolymer, k represents the overall degree of polymerization, and x is a number from zero to less than 1; or by 2. contacting at least one activated poly(aryl ether/thioether) polymer corresponding to the formula:

wherein A is an activated aromatic radical having at least one electron-withdrawing group located in a position ortho or para to its ether/thioether linking group, O' is oxygen or sulfur in the case of a thioether, and n represents the number of repeated activated aryl ether/thioether units in the activated poly(aryl ether/thioether) polymer, with at least one activated poly(aryl carbonate) polymer corresponding to the formula:

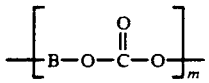

wherein B is an activated aromatic radical having at least one electron-withdrawing group located in a position ortho or para to its carbonate linking group, O is oxygen, C is carbon, and m represents the number of repeated activated aryl carbonate units in the activated poly(aryl carbonate) polymer, in the presence of an effective amount of at least one exchange catalyst, at an elevated temperature and for a time, sufficient to prepare a poly(aryl ether/thioether)-poly(aryl carbonate) block copolymer corresponding to the formula:

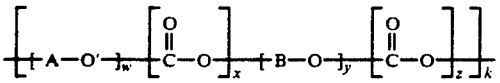

wherein A, B, O, O' and C are as previously defined, w represents the number of repeated activated aryl ether/thioether units in the poly(aryl ether/thioether)-poly(aryl carbonate) block copolymer, y represents the number of repeated activated aryl carbonate units in the poly(aryl ether/thioether)-poly(aryl carbonate) block copolymer, k represents the overall degree of polymerization, and x and z each independently is a number from zero to less than 1.

As indicated above, the poly(aryl ether/thioether)-poly(aryl carbonate) block copolymers of the present invention may alternatively be prepared using either poly(aryl ether) homopolymers or poly(aryl thioether) homopolymers or mixtures of each. A thioether is understood to mean an ether compound wherein a sulfur atom is substituted for the normally present ether oxygen atom.

The poly(aryl ether/thioether)-poly(aryl carbonate) block copolymers prepared according to the present invention exhibit high temperature stability and excellent thermoplastic engineering properties, as well as superior solvent resistance when prepared in crystalline form, making them particularly suitable for producing molded plastic components.

DETAILED DESCRIPTION

Accordant with the present invention, poly(aryl ether/thioether)-poly(aryl carbonate) block copolymers are prepared by reacting together "activated" poly(aryl ether/thioether) polymers with poly(aryl carbonate) polymers to form a block copolymer, represented by the formula:

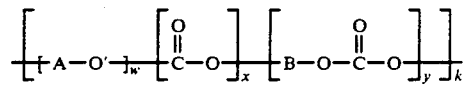

wherein A, B, O, O', C, w, x, y and k are as previously defined. Preferably A is a divalent $C_{6-30}$ aromatic radical.

In another embodiment of the present invention, "activated" poly(aryl carbonate) polymers are additionally used to prepare a poly(aryl ether/thioether)-poly(aryl carbonate) block copolymer represented by the formula:

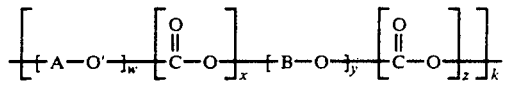

wherein A, B, O, O', C, w, x, y, z and k are as previously defined. Preferably B is a divalent $C_{6-30}$ aromatic radical.

The term activated, as used hereinabove, means that the particular aryl compound contains at least one electron-withdrawing substituent at a position ortho or para to its ether/thioether or carbonate linking group.

Suitably any activated poly(aryl ether/thioether) polymer may be employed in the present invention, providing that it contains at least one electron-withdrawing substituent at a position ortho or para (preferably para) to its ether/thioether linking group. The poly(aryl ether/thioether) homopolymer of the present invention may be prepared by the polycondensation of an aromatic acid in the presence of a boron trifluoride-hydrogen fluoride catalyst. See U.S. Pat. No. 3,442,857, which is incorporated herein by reference.

Alternatively, poly(aryl ether/thioether) homopolymers may be prepared by the polycondensation of the anhydrous alkali metal salt of an aryl fluoride in the presence of diphenyl sulphone solvent, as disclosed in Atwood et al, Polymer, vol. 22, p. 1096 (1981).

Specific examples of suitable activated poly(aryl ether/thioether) polymers containing properly positioned electron-withdrawing groups may be prepared from the following mer units:

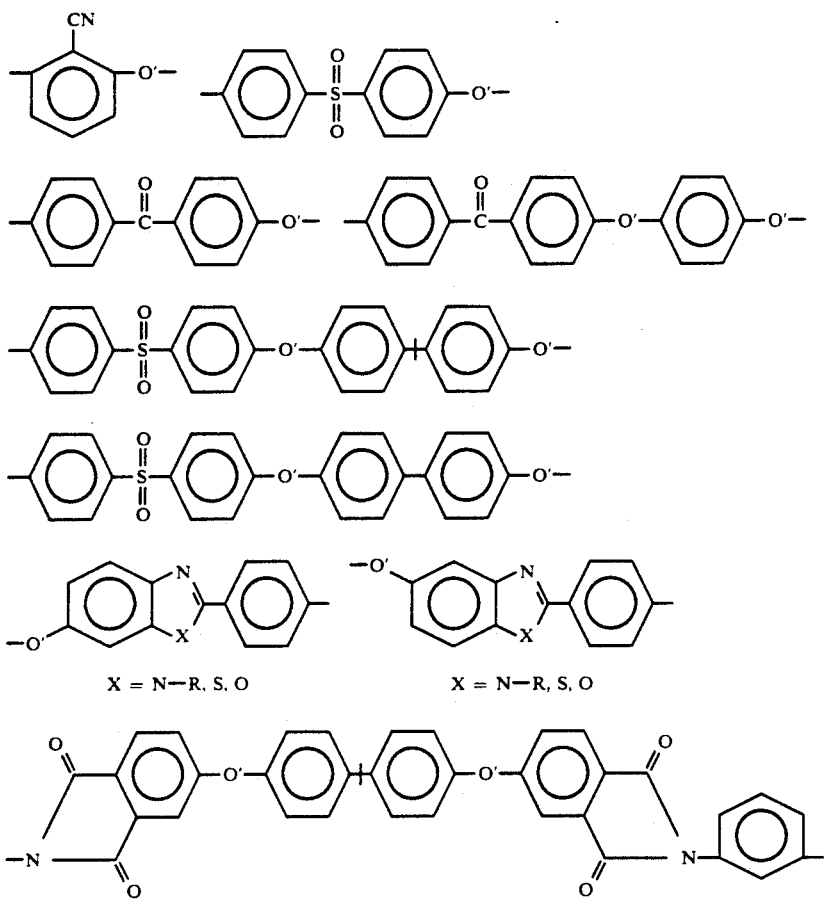

Suitable electron-withdrawing groups may be, without limitation to those specifically recited, divalent groups at the para position such as for example —CO—, —CONH—, —SO—, —SO$_2$—, —$^+$NR$_2$—, —$^+$PR$_2$—, —$^+$SR—, —P(O)R—, —C(CF$_3$)$_2$—, —CH=CH—, —NN—, —CHNNCH—, imidazolenyl, oxazolenyl, pyrazolenyl, isoxazolenyl, oxypyrazolenyl, benzoquinonenyl, benzoxazolenyl and benzothiazolenyl, or monovalent groups at the ortho position such as for example —CN, —NO$_2$, —CHO, —CO$_2$R, —CO$_2$NH$_2$, —P(O) (OR)$_2$, —P(O)R, —CF$_3$, —$^+$PR$_3$, —$^+$NR$_3$ and —$^+$SR$_2$, wherein R is independently each occurrence a C$_1$-C$_{12}$ alkyl radical.

A preferred activated poly(aryl ether/thioether) homopolymer is poly(ether sulfone).

The poly(aryl carbonate) homopolymers suitable for use in the present invention are produced by any of the conventional processes known in the art for the manufacture of polycarbonates. Generally, poly(aryl carbonate) polymers are prepared by reacting an aromatic dihydric phenol with a carbonate precursor such as for example phosgene, a haloformate or a carbonate ester.

A preferred method for preparing the polycarbonates suitable for use in the present invention involves the use of a carbonyl halide, such as phosgene, as the carbonate precursor. This method involves passing phosgene gas into a reaction mixture containing an activated dihydric phenol, or a nonactivated dihydric phenol and an acid acceptor, such as for example pyridine, dimethyl analine, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenols present. Generally speaking, one mole of phosgene will react with one mole of dihydric phenol to form the polycarbonate and two moles of HCl. The HCl is in turn taken up by the acid acceptor.

Another method for preparing the poly(aryl carbonate) polymers useful in the present invention comprises adding phosgene to an alkaline aqueous suspension of dihydric phenols. This is preferably done in the presence of inert solvents such as methylene chloride 1,2-dichloroethane and the like. Quaternary ammonium compounds may be employed to catalyze the reaction.

Yet another method for preparing such poly(aryl carbonate) polymers involves the phosgenation of an agitated suspension of the anhydrous alkali salts of aryl diols in a nonaqueous medium such as benzene, chlorobenzene or toluene. The reaction is illustrated by the addition of phosgene to a slurry of the sodium salt of, for example, Bisphenol A in an inert polymer solvent such as chlorobenzene. The organic solvent should preferably be a polymer solvent.

Generally speaking, a haloformate such as the bis-haloformate of Bisphenol A may be substituted for phosgene as the carbonate precursor in any of the methods described above.

When a carbonate ester is used as the carbonate precursor in the poly(aryl carbonate) forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0.001% to about 0.1%, based on the moles of the dihydric phenols employed.

In the solution methods of preparation, the poly(aryl carbonate) polymer emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

The aforementioned methods of preparing poly(aryl carbonate) homopolymers are more fully set forth in U.S. Pat. Nos. 2,999,846; 3,028,365; 3,148,172; 3,153,008; 3,248,414; 3,271,367; and 4,452,968, which are hereby incorporated by reference thereto.

A poly(aryl carbonate) polymer suitable for use in the present invention may optionally contain an electron-withdrawing substituent at a position ortho or para (preferably para) to its carbonate linking group. Where such an electron-withdrawing group is absent, the resultant block copolymers of the present invention are represented by the formula:

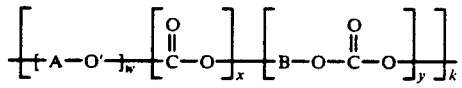

wherein A, B, O, O', C, w, x, y and k are as previously defined. Where at least one of the aforementioned electron-withdrawing groups is present, the resultant block copolymers of the present invention are represented by the formula:

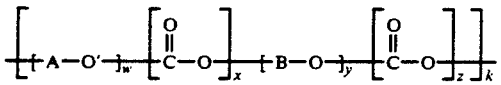

wherein A, B, O, O', C, w, x, y, z and k are as previously defined.

Examples of suitable nonactivated poly(aryl carbonate) polymers, according to the present invention, may be prepared from the following mer units:

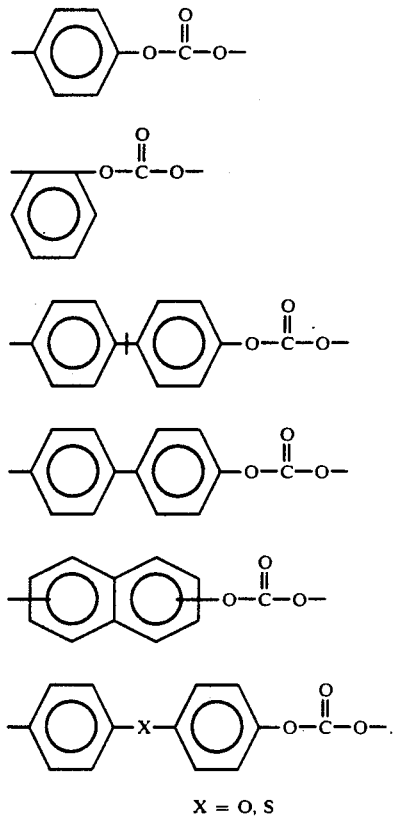

X = O, S

Examples of suitable activated poly(aryl carbonate) polymers, according to the present invention, may be prepared from the following mer units:

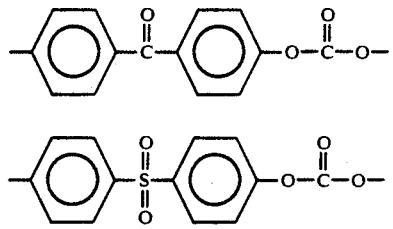

A preferred activated poly(aryl carbonate) is Bisphenol S, and a preferred nonactivated poly(aryl carbonate) is Bisphenol A.

An exchange catalyst suitable for use in the present invention is represented by the formula:

$M_p Z_q$ wherein M represents a monovalent or multivalent metal ion, Z is a halo, carbonate, bicarbonate, phenoxide, alkoxide, cyanide, nitrate, nitrite, hydroxide, phosphate, or aryl or alkyl carboxylate radical, and p and q are whole numbers in the range from 1 to 6 which satisfy chemical valency requirements. An effective amount of catalyst, according to the present invention, is that amount which will catalyze the reaction between a poly(aryl ether/thioether) and a poly(aryl carbonate) to prepare a poly(aryl ether/thioether)-poly(aryl carbonate) block copolymer. Preferred catalysts, according to the present invention, are cesium fluoride, cesium carbonate and cesium phenoxide. A most preferred catalyst is cesium fluoride.

The block copolymerization of the present invention is carried out by blending poly(aryl ether/thioether) and poly(aryl carbonate) homopolymers, at a temperature at least as high as the highest of the glass transition temperatures of the oligomers, in the presence of an exchange catalyst, and optionally in the presence of a solvent. High boiling point solvents, such as for example, diphenyl sulfone or benzophenone are preferred. Copolymerization is allowed to proceed until the desired block segment lengths are achieved, as determined by experimentation, at which time the reaction is terminated. The reaction is typically effected at temperatures in the range from about 150° C. to about 400° C., depending upon the glass transition temperatures of the oligomers; preferably the range is from about 250° C. to about 350° C.; most preferably, the effective temperature range is from about 280° C. to about 320° C. The catalyst is preferably employed in an amount in the range from about 0.001 to about 10.0 weight percent; more preferably the range is from about 0.01 to about 2.0 weight percent; most preferably, the effective range is from about 0.1 to about 0.5 weight percent.

The block copolymers of the present invention may be prepared by contacting, under poly(aryl ether/thioether)-poly(aryl carbonate) block copolymer forming conditions, varying quantities of activated poly(aryl ether/thioether) polymers with either or both of nonactivated or activated poly(aryl carbonate) polymers, wherein the ratio of poly(aryl ether/thioether) to poly(aryl carbonate) polymers is in the range from about 99:1 to about 1:99.

While not wishing to be bound by any particular theory regarding the copolymerization reaction of the present invention, it is believed that the probable mechanism comprises three distinct steps.

The initial step involves chain cleavage by the nucleophilic anion of an exchange catalyst salt at one of the oxygen/sulfur-carbon bonds in the poly(aryl ether/thioether) polymer molecule:

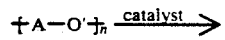

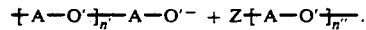

This produces two polymer fragments; a shortened poly(aryl ether/thioether) polymer molecule having a catalyst salt ion terminus, and an anionic phenate terminated poly(aryl ether/thioether) polymer molecule.

In the second step, the anionic fragment produced in the first step attacks a poly(aryl carbonate) polymer molecule at a carbonate linkage:

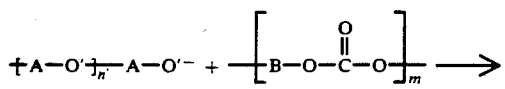

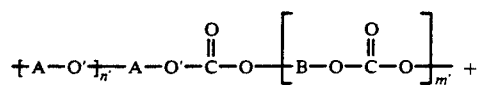

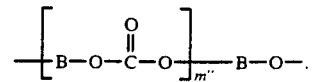

As in step one, a neutral molecule is formed as well as an anionic molecule. The neutral polymer molecule is a block copolymer which contains a poly(aryl ether/thioether) block and a poly(aryl carbonate) block, joined by an asymmetrical carbonate radical. The resultant anionic polymer molecule is free to attack other polymer molecules to form new polymers and new anionic molecules.

The third step involves decarboxylation of the block copolymer formed in step two. The asymmetrical carbonate radical is attacked by a catalyst salt ion or other anionic molecule, forming first an aryl salt molecule and another anionic molecule (thereby releasing carbon dioxide). Thereafter the molecules are reunited to form the poly(aryl ether/thioether)-poly(aryl carbonate) block copolymer having an ether oxygen or thioether sulfur as its linking group:

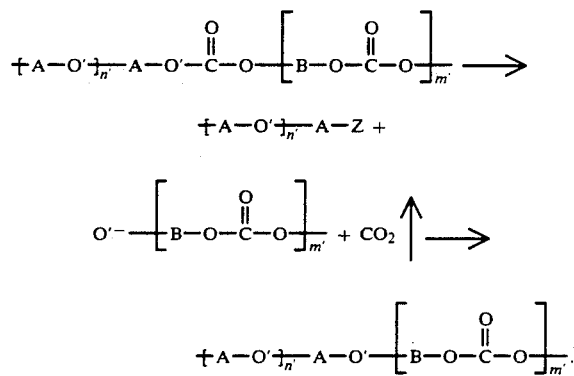

As the reaction proceeds, the concentration of homopolymers decreases, and the concentration of block copolymers increases. Also, the copolymer block lengths decrease with time. The relative lengths of the poly(aryl ether/thioether) and poly(aryl carbonate) block segments tends to be proportional to their respective starting homopolymer percentages.

There are several advantages in the preparation of the poly(aryl ether/thioether)-poly(aryl carbonate) block copolymers of the present invention over the prior art. The present process may be practiced using relatively inexpensive blending equipment. The tremendous capital investment normally required to commercialize a new engineering thermoplastic is thereby circumvented. In the conventional method for the preparation of poly(aryl ether/thioether)-poly(aryl carbonate) block copolymers, it is necessary to prepare each block separately before linking them in a final reaction. The present invention allows for the preparation of block copolymers having various block segment lengths, depending upon the reaction conditions. This is an important advantage since copolymer properties are strongly dependent on block segment lengths.

The present invention is useful for preparing crystalline block copolymers. The conventional phosgene process is successful only when both poly(aryl ether/thioether) and poly(aryl carbonate) prepolymers are soluble in a solvent which itself is unreactive toward phosgene. Since crystalline thermoplastics are generally insoluble in such solvents, precipitation occurs before high molecular weight is achieved. The present invention by contrast allows for the preparation of high molecular weight crystalline block copolymers.

During the reactive blending process of the present invention, the amount of poly(aryl ether/thioether)-poly(aryl carbonate) copolymer increases, and the lengths of the block segments decrease. The properties of the resultant block copolymer product may be changed by modifying the reaction conditions, such as the length of time that the polymers are reacted together, the nature of the poly(aryl ether/thioether) and poly(aryl carbonate) homopolymers, or the reaction temperature. For example, when Bisphenol A polycarbonate and poly(ether sulfone) are contacted over a long period of time in the presence of an exchange catalyst according to the present invention, (see Example 1), the copolymer block segments become sufficiently short such that no phase segregation occurs, and a homogeneous product results; the appearance of the mixture changes from opaque to clear. Additionally, a single intermediate glass transition temperature is observed for the copolymer. It is known that the minimum copolymer block segment lengths required for a copolymer to exhibit single phase behavior is strongly dependent on the solubility characteristics of the blocks in the copolymer. In contrast to the previous example, poly(aryl ether/thioether) and poly(aryl carbonate) polymers may be contacted under different reactive conditions, resulting in a product in which only about one percent of the homopolymers have combined to form a poly(aryl ether/thioether)-poly(aryl carbonate) block copolymer.

The homogeneous poly(aryl ether/thioether)-poly(aryl carbonate) block copolymers of the present invention are more easily formed into finished products than the corresponding immiscible blends of the unreacted poly(aryl ether/thioether) and poly(aryl carbonate) homopolymers. When molding finished products from immiscible multi-phase polymer blends, the morphology of the molded pieces will determine their structural integrity. Likewise, the heat distortion temperature of an immiscible blend will often be determined by the lowest glass transition temperature of the polymers. The single phase poly(aryl ether/thioether)-poly(aryl carbonate) block copolymers obtainable by the present invention overcome the aforementioned processing difficulties, resulting in isotropic molded articles having a glass transition temperature which is intermediate, relative to the original homopolymer blend.

The procedure of blending polymers for commercial use is commonly practiced in order to improve one or more properties of one of the polymers by the addition of another. In the present invention, the properties of the homogeneous single-phase block copolymer are generally intermediate between the properties of the starting homopolymer materials. In this fashion, improved molding compositions may be obtained at minimal additional cost.

Combinations of polymers which are miscible, and which therefore form homogeneous blends, are rare. Generally, polymer blends consist of immiscible segregated domains which suffer from poor adhesion with one another, resulting in finished molded products exhibiting poor ductility and impact resistance. The present invention may advantageously be employed to transform immiscible poly(aryl ether/thioether) and poly(aryl carbonate) homopolymer blends into a homogeneous block copolymer or, during the early stages of the reactive blending process, a composition comprising a compatibilizing amount of the block copolymer and a residual amount of the homopolymers. It is known that block copolymers are often excellent compatibilizing agents for their constituent homopolymers. See Kirk-Othmer "Encyclopedia of Chemical Technology," 3rd Edition, vol. 18, p. 433 (1982).

The invention is more easily comprehended by reference to specific embodiments which are representative of the invention. It must be understood, however, that the specific embodiments are provided only for the purposes of illustration and understanding, and that the invention may be practiced otherwise than as specifically illustrated and described without departing from its scope.

EXAMPLE 1

Preparation of a 50/50 Copolymer From Bis A Polycarbonate and Poly(Ether Sulfone) Using Cesium Fluoride Catalyst A mixture of 10.0 g of poly(ether sulfone) (a poly(aryl ether) sold by Imperial Chemical Ind. under the trademark VICTREX TYPE 3600G) and 10.0 g of polycarbonate (a poly(aryl carbonate) sold by The Dow Chemical Company under the trademark CALIBRE TYPE 300-3) was dried in a vacuum oven at 130° C. for 48 hours. The mixture was combined with 10.0 g of diphenyl sulfone and 50 mL of chlorobenzene in a 300 mL glass kettle equipped with a short path still, mechanical stirrer, nitrogen inlet and an addition port. The resultant mixture was stirred and heated to 250° C. for a period of 30 minutes under a nitrogen atmosphere, during which time the chlorobenzene distilled off thereby removing residual water as an azeotrope. A catalyst, 140.5 mg of cesium fluoride, was added, and the glass kettle was evacuated and vented to argon three times. The mixture was stirred and heated to 280° C. for 20 minutes, thence to 290° C. for 195 minutes. The mixture changed in appearance from opaque to clear amber after 90 minutes of heating at the 290° C. temperature level. The resultant mixture was removed from the kettle and dissolved in $CH_2Cl_2$, then washed with 0.25M HCl, washed three more times with deionized water and filtered. The resultant solution of polymer in methylene chloride was precipitated in methanol, filtered, then washed three times with additional methanol. The resultant fluffy white copolymer was dried in a vacuum oven at 140° C. for 48 hours, then compression molded at 290° C. into 20 mil. film test specimens. Portions of the film were redissolved into methylene chloride, resulting in an inherent viscosity measurement of 0.49 dL/g at 25° C. and a concentration of 0.5 g/dL. A single Tg was measured at 185° C. by differential scanning calorimetry. The $^{13}C$ NMR spectrum analysis clearly indicated that the film contained copolymer.

EXAMPLE 2

Preparation of a 50/50 Copolymer From Bis A Polycarbonate and Poly(Ether Sulfone) Using Cesium Fluoride Catalyst A mixture of 100.0 g each of the poly(aryl ether) and poly(aryl carbonate) described in Example 1 was dried in a vacuum oven at 130° C. The resultant mixture was placed in a preheated (290° C.) Haake mixer having a nitrogen atmosphere. After ten minutes of mixing, a catalyst, 1.0 g of cesium fluoride, was added. Mixing continued for 120 minutes, during which time the reaction mixture temperature increased to 307° C. due to the heat of mixing. The appearance of the mixture during this time changed from opaque to translucent. The entire procedure was repeated two more times, and the three resulting products composited to obtain enough material for the injection molding of ASTM D638 tensile test bars, which showed good elongation at break. Differential scanning calorimetry showed two Tg's at 158° C. and 204° C., indicating the presence of two phases. Test samples were redissolved into methylene chloride, resulting in an inherent viscosity measurement of 0.48 dL/g at 25° C. and a concentration of 0.5 g/dL.

EXAMPLE 3

Preparation of a 50/50 Copolymer From Bis A Polycarbonate and Poly(Ether Sulfone) Using Cesium Carbonate Catalyst A mixture of 15.0 g each of the poly(aryl ether) and poly(aryl carbonate) described in Example 1 was placed in a 300 mL glass kettle. The mixture was maintained at 170° C. for two hours under a vacuum to remove residual water. Diphenyl sulfone (15.0 g) and cesium carbonate (84.7 mg) were then added to the mixture, and air was purged from the kettle by alternately evacuating and venting it to nitrogen three times. The kettle was heated and the mixture stirred and maintained at 280° C. for three hours. The resultant mixture was dissolved in 150 mL of methylene chloride, then precipitated into 1.5 L of a mixture of acetone and hexane (75:25 by volume). The precipitate was filtered, then washed twice with additional quantities of the acetone/hexane solvent. The resultant sticky white copolymer was dissolved into 1 L of hexane, the solution filtered, and the polymer separated and dried in a vacuum oven at 140° C. for 48 hours. The polymer was compression molded at 290° C. into 20 mil. film test specimens. Portions of the film were redissolved into methylene chloride, resulting in an inherent viscosity measurement of 0.42 dL/g at 25° C. and a concentration of 0.5 g/dL. Differential scanning calorimetry indicated two Tg's at 168° C. and 219° C. The $^{13}$C NMR spectrum analysis clearly indicated that the film contained copolymer.

EXAMPLE 4

Hydrolysis of PES/PC Copolymer

Example 1 was repeated using 7.50 g of poly(ether sulfone), 8.21 g of polycarbonate, 10.0 g of diphenyl sulfone, 50 mL of chlorobenzene and 69.6 mg of cesium fluoride, excepting that the reaction mixture was maintained at 280° C. for 175 minutes (the appearance of the mixture changed from opaque to translucent after 160 minutes of heating). The copolymer was isolated using the procedure described in Example 1, and compression molded at 290° C. into 20 mil. film test specimens. Portions of the film were redissolved into methylene chloride resulting in an inherent viscosity measurement of 0.39 dL/g at 25° C. and a concentration of 0.5 g/dL. Two Tg's were measured at 140° C. and 175° C. by differential scanning calorimetry.

The lengths of the ether blocks of the resultant copolymer were determined as follows: A portion of the copolymer (1.9244 g) was dissolved into a mixture of 20 mL of methanol, 20 mL of methylene chloride and 1.97 g of potassium hydroxide, under a nitrogen atmosphere. The reaction was carefully acidified with 6M HCl, and the volatile material allowed to evaporate. The phenolic ends of the ether blocks were acetylated by refluxing the residue with 20 mL of acetic anhydride plus 2 drops of pyridine for 10 minutes. The volatiles were again evaporated, and the residue partitioned between water and methylene chloride, then dried with MgSO$_4$. The diacetate of Bis A, which was formed during the acetylation was removed using bulb-to-bulb distillation at 250° C. and 0.1 mm of Hg. The residue contained acetylated poly(ether sulfone) polymer with a number average molecular weight of 2,570 as determined by $^1$H NMR spectrum analysis.

EXAMPLE 5

Comparative Example-Preparation of a 50/50 Blend From Bis A Polycarbonate and Poly(Ether Sulfone)

A simple blend of homopolymers was prepared for comparison. A mixture of 5.0 g of the poly(ether sulfone) and 5.0 g of the polycarbonate of Example 1 was dissolved into 150 mL of tetrachloroethane at 100° C. A polymer blend was isolated from the hazy solution by precipitation in 1 L of methanol, followed by drying in a vacuum oven at 120° C. The resultant fluffy white polymer was compression molded at 290° C. into 20 mil. opaque sheet test specimens. Portions of the film were redissolved into methylene chloride, resulting in an inherent viscosity measurement of 0.41 dL/g at 25° C. and a concentration of 0.5 g/dL. Two Tg's were measured at 150° C. and 225° C. by differential scanning calorimetry.

EXAMPLE 6

Preparation of a 50/50 Copolymer From Bis A Polycarbonate and Poly(Ether Imide)

Example 1 was repeated using 10.0 g of the previously specified polycarbonate, 10.0 g of poly(ether imide) (sold by General Electric Co. under the trademark ULTEM 1000), 10.0 g of diphenyl sulfone, 50 mL of chlorobenzene and 91.1 mg of cesium fluoride catalyst, excepting that the reaction mixture temperature was raised from 275° C. to 290° C. over a period of 31 minutes (the appearance of the mixture changed from opaque to clear brown after 25 minutes). The copolymer was isolated using the procedure described in Example 1, and compression molded at 290° C. into 20 mil. film test specimens. Portions of the film were redissolved into methylene chloride, resulting in an inherent viscosity measurement of 0.47 dL/g at 25° C. and a concentration of 0.5 g/dL. A single Tg of 175° C. was measured by differential scanning calorimetry.

EXAMPLE 7

Example 6 was repeated without the cesium fluoride catalyst. The mixture was maintained at 290° C. for 195 minutes, remaining opaque in appearance throughout. The inherent viscosity for compression molded specimens redissolved into methylene chloride was 0.43 dL/g at 25° C. and a concentration of 0.5 g/dL. Two Tg's were measured at 135° C. and 195° C. by differential scanning calorimetry.

What is claimed is:

1. A process for the preparation of a mixture of poly(aryl ether/thioether)-poly(aryl carbonate) block copolymers, comprising contacting:
   at least one activated poly(aryl ether/thioether) homopolymer corresponding to the formula:

$$\text{+A—O'+}_n$$

wherein A is an activated aromatic radical having at least one electron-withdrawing group located in a position ortho or para to its ether/thioether linking group, and O' is oxygen or sulfur in the case of a thioether, and n represents the number of repeated activated arylether/thioether units in the activated polyarylether/thioether homopolymer, with at least one poly(aryl carbonate) homopolymer corresponding to the formula:

$$\text{+B—O—COO+}_m$$

wherein B is an aromatic radical,
in the presence of an effective amount of at least one exchange catalyst, at an elevated temperature and for a time, sufficient to prepare a poly(aryl ether/thioether)-poly(aryl carbonate) block copolymer corresponding to the formula:

$$\text{+( A—O'+}_{n'}\text{ —AO'COO+B—O—COO)}_{m'}\text{ +, or}$$
$$\text{+( A—O'+}_{n'}\text{ —AO'+B—O—COO)}_{m'}\text{ +}$$

wherein n' is equal to the number of repeated activated arylether/thioether units in the copolymer block segment and m' is equal to the number of repeated poly(aryl carbonate) units in the copolymer block segment.

2. The process according to claim 1, wherein the catalyst corresponds to the formula:

$$M_pZ_q$$

wherein M represents a monovalent or multivalent metal ion, Z is a halo, carbonate, bicarbonate, phenoxide, alkoxide, cyanide, nitrate, nitrite, hydroxide, phosphate, or aryl or alkyl carboxylate ion, and p and q are each independently whole numbers in the range from 1 to 6 which satisfy chemical valency requirements.

3. The process according to claim 2, wherein the catalyst is selected from the group consisting of cesium fluoride, cesium carbonate and cesium phenoxide.

4. The process according to claim 1, wherein at least about 1% of the poly(aryl ether/thioether) and poly(aryl carbonate) homopolymers combine to prepare the poly(aryl ether/thioether)-poly(aryl carbonate) block copolymer.

5. The process according to claim 4, wherein about 100% of the poly(aryl ether/thioether) and poly(aryl carbonate) homopolymers combine to prepare the poly(aryl ether/thioether)-poly(aryl carbonate) block copolymer.

6. The process according to claim 1, wherein A is a divalent $C_6$-$C_{30}$ aromatic radical.

7. A process according to claim 1 wherein B is an activated aromatic radical having at least one electron-withdrawing group located in a position ortho or para to its carbonate linking group.

8. The process according to claim 1, wherein B is a divalent $C_6$-$C_{24}$ aromatic radical.

9. The process according to claim 8, wherein the aromatic radical contains substituent $C_1$-$C_{20}$ aliphatic radicals, halo radicals, alkoxy radicals, aryloxy radicals, thioalkoxy radicals or thioaryloxy radicals, or internal $C_1$-$C_{20}$ aliphatic radicals, alkoxy radicals, aryloxy radicals, thioalkoxy radicals or thioaryloxy radicals.

10. A process according to claim 1, wherein the electron-withdrawing group is a divalent radical in the para position selected from —CO—, —CONH— —SO—, —$SO_2$—, —$^+NR_2$—, —$^+PR_2$—, —$^+SR$—, —P(O)R—, —$(CF_3)_2$—, —CH=CH—, —NN—, —CHNNCH—, imidazolenyl, oxazolenyl, pyrazolenyl, isoxazolenyl, oxopyrazolenyl, benzoquinonenyl, benzoxazolenyl, or benzothiazolenyl, or a monovalent radical in the ortho position selected from —CN, —$NO_2$, —CHO, —$CO_2R$, —$CO_2NH_2$, —P(O)(OR)$_2$, —P(O)R, —$CF_3$, —$^+PR_3$, —$^+NR_3$, or —$^+SR_2$, wherein R is a $C_1$-$C_{12}$ alkyl radical.

11. The process according to claim 1, wherein the poly(aryl carbonate) homopolymer is prepared from Bisphenol A.

12. The process according to claim 1, wherein the poly(aryl ether/thioether) homopolymer is poly(ether sulfone).

13. The process according to claim 1, wherein the contacting is carried out in the presence of a solvent.

14. The process according to claim 13, wherein the solvent is selected from the group consisting of diphenyl sulfone and benzophenone.

15. The process according to claim 3, wherein the catalyst is present in an amount from about 0.001 to about 10.0 weight percent relative to the total weight of polymers.

16. The process according to claim 15, wherein the catalyst is present in an amount from about 0.01 to about 2.0 weight percent relative to the total weight of polymers.

17. The process according to claim 14, wherein the solvent is present in an amount from about 0.1 to about 1,000.0 weight percent relative to the total weight of polymers.

18. The process according to claim 17, wherein the solvent is present in an amount from about 0.1 to about 200.0 weight percent relative to the total weight of polymers.

19. The process according to claim 1, wherein the temperature during contacting is from about 150° C. to about 400° C.

20. The process according to claim 19, wherein the temperature during contacting is from about 250° C. to about 350° C.

21. The process according to claim 7, wherein the catalyst corresponds to the formula:

$$M_pZ_q$$

wherein M represents a monovalent or multivalent metal ion, Z is a halo, carbonate, bicarbonate, phenoxide, alkoxide, cyanide, nitrate, nitrite, hydroxide, phosphate, or aryl or alkyl carboxylate ion, and p and q are each independently whole numbers in the range from 1 to 6 which satisfy chemical valency requirements.

22. The process according to claim 21, wherein the catalyst is selected from the group consisting of cesium fluoride, cesium carbonate and cesium phenoxide.

23. The process according to claim 7, wherein at least about 1% of the poly(aryl ether/thioether) and poly(aryl carbonate) homopolymers combine to prepare the poly(aryl ether/thioether)-poly(aryl carbonate) block copolymer.

24. The process according to claim 23, wherein about 100% of the poly(aryl ether/thioether) and poly(aryl carbonate) homopolymers combine to prepare the poly(aryl ether/thioether)-poly(aryl carbonate) block copolymer.

25. The process according to claim 7, wherein A is a divalent $C_6$-$C_{30}$ aromatic radical.

26. The process according to claim 25, wherein the aromatic radical contains substituent $C_1$-$C_{20}$ aliphatic radicals, halo radicals, alkoxy radicals, aryloxy radicals, thioalkoxy radicals or thioaryloxy radicals or internal $C_1$-$C_{20}$ aliphatic radicals, alkoxy radicals, aryloxy radicals, thioalkoxy radicals or thioaryloxy radicals.

27. The process according to claim 7, wherein B is a divalent $C_6$-$C_{24}$ aromatic radical.

28. A process according to claim 7, wherein the electron-withdrawing group is a divalent radical in the para position selected from —CO—, —CONH— —SO—, —$SO_2$—, —$^+NR_2$—, —$^+PR_2$—, —$^+SR$—, —P(O)R—, —$(CF_3)_2$—, —CH=CH—, —NN—, —CHNNCH—, imidazolenyl, oxazolenyl, pyrazolenyl, isoxazolenyl, oxopyrazolenyl, benzoquinonenyl, benzoxazolenyl, or benzothiazolenyl, or a monovalent radical in the ortho position selected from —CN, —$NO_2$, —CHO, —$CO_2R$, —$CO_2NH_2$, —$P(O)(OR)_2$, —P(O)R, —$CF_3$, —$^+PR_3$, —$^+NR_3$, or —$^+SR_2$, wherein R is a $C_1$-$C_{12}$ alkyl radical.

29. The process according to claim 7, wherein the poly(aryl carbonate) homopolymer is prepared from Bisphenol S.

30. The process according to claim 7, wherein the poly(aryl ether/thioether) homopolymer is poly(ether sulfone).

31. The process according to claim 7, wherein the contacting is carried out in the presence of a solvent.

32. The process according to claim 31, wherein the solvent is selected from the group consisting of diphenyl sulfone and benzophenone.

33. The process according to claim 22, wherein the catalyst is present in an amount from about 0.001 to about 10.0 weight percent relative to the total weight of polymers.

34. The process according to claim 33, wherein the catalyst is present in an amount from about 0.01 to about 2.0 weight percent relative to the total weight of polymers.

35. The process according to claim 32, wherein the solvent is present in an amount from about 0.1 to about 1,000.0 weight percent relative to the total weight of polymers.

36. The process according to claim 35, wherein the solvent is present in an amount from about 0.1 to about 200.0 weight percent relative to the total weight of polymers.

37. The process according to claim 7, wherein the temperature during contacting is from about 150° C. to about 400° C.

38. The process according to claim 37, wherein the temperature during contacting is from about 250° C. to about 350° C.

39. The process according to claim 1, wherein the catalyst is selected from the group consisting of cesium fluoride and cesium phenoxide.

40. The process according to claim 16, wherein the catalyst is present in an amount from about 0.1 to about 0.5 weight percent relative to the total weight of polymers.

41. The process according to claim 21, wherein the catalyst corresponds to the formula:

$$M_p Z_q$$

wherein M represents a monovalent or multivalent metal ion, Z is a halo, phenoxide, alkoxide, cyanide, nitrate, nitrite, hydroxide, phosphate, or aryl or alkyl carboxylate ion, and p and q are each independently whole numbers in the range from 1 to 6 which satisfy chemical valency requirements.

42. The process according to claim 41, wherein the catalyst is selected from the group consisting of cesium fluoride and cesium phenoxide.

43. The process according to claim 34, wherein the catalyst is present in an amount from about 0.1 to about 0.5 weight percent relative to the total weight of polymers.

* * * * *

UNITED STATES PATENT AND TRADEMARK OFFICE
CERTIFICATE OF CORRECTION

PATENT NO. : 5,077,350
DATED : December 31, 1991
INVENTOR(S) : Michael J. Mullins et al.

It is certified that error appears in the above-identified patent and that said Letters Patent is hereby corrected as shown below:

Title page, the title of the application, following CARBONATE, insert --)--.

Title page, References Cited, U.S. Patent Documents, "4,845,806" should correctly read --4,645,806--.

Title page, References Cited, U.S. Patent Documents, "4,857,977" should correctly read --4,657,977--.

Signed and Sealed this

Twelfth Day of October, 1993

Attest:

BRUCE LEHMAN

*Attesting Officer*        *Commissioner of Patents and Trademarks*